United States Patent
Watanabe et al.

(10) Patent No.: US 7,844,153 B2
(45) Date of Patent: Nov. 30, 2010

(54) ACTIVE ENERGY RAY-CURABLE ORGANOPOLYSILOXANE RESIN COMPOSITION, OPTICAL TRANSMISSION COMPONENT, AND MANUFACTURING METHOD THEREOF

(75) Inventors: Toshinori Watanabe, Ichihara (JP); Takuya Ogawa, Chiba (JP)

(73) Assignee: Dow Corning Corporation, Tokyo (JP)

( * ) Notice: Subject to any disclaimer, the term of this patent is extended or adjusted under 35 U.S.C. 154(b) by 618 days.

(21) Appl. No.: 11/569,788

(22) PCT Filed: May 30, 2005

(86) PCT No.: PCT/JP2005/010293

§ 371 (c)(1),
(2), (4) Date: Aug. 3, 2007

(87) PCT Pub. No.: WO2005/116113

PCT Pub. Date: Dec. 8, 2005

(65) Prior Publication Data

US 2008/0032061 A1 Feb. 7, 2008

(30) Foreign Application Priority Data

May 31, 2004 (JP) .............................. 2004-160720

(51) Int. Cl.
*G02B 6/00* (2006.01)
*G02B 6/10* (2006.01)
*C08G 77/14* (2006.01)
*G03C 1/54* (2006.01)
*G03C 1/73* (2006.01)

(52) U.S. Cl. ....................... 385/123; 385/100; 385/115; 385/129; 385/141; 522/15; 522/25; 522/148

(58) Field of Classification Search ................ 522/148, 522/15, 18, 25, 28, 16, 26; 385/123, 100, 385/115, 129, 141
See application file for complete search history.

(56) References Cited

U.S. PATENT DOCUMENTS

| | | | | | |
|---|---|---|---|---|---|
| 5,693,688 | A | * | 12/1997 | Priou | .......................... 522/25 |
| 5,739,174 | A | * | 4/1998 | Hara | .......................... 522/25 |
| 6,121,340 | A | * | 9/2000 | Shick et al. | .................... 522/31 |
| 6,610,760 | B2 | * | 8/2003 | Eckberg et al. | ............... 522/25 |
| 6,784,300 | B2 | * | 8/2004 | Cetin et al. | ................. 549/215 |
| 6,832,036 | B2 | * | 12/2004 | Ghoshal et al. | ............. 385/143 |
| 7,031,591 | B2 | * | 4/2006 | Kodama et al. | ............. 385/143 |
| 7,122,290 | B2 | * | 10/2006 | McLaughlin et al. | ...... 430/270.1 |

FOREIGN PATENT DOCUMENTS

| | | |
|---|---|---|
| EP | 0355381 A1 | 2/1990 |
| EP | 0581542 A2 | 2/1994 |
| JP | 6298940 | 10/1994 |
| WO | WO2005/056640 A1 | 6/2005 |

OTHER PUBLICATIONS

English language translation and abstract for JP6298940 extracted from Seaching PAJ, Oct. 25, 1994.

* cited by examiner

*Primary Examiner*—Susan W Berman
(74) *Attorney, Agent, or Firm*—Howard & Howard Attorneys PLLC

(57) ABSTRACT

An active energy ray (e.g. UV rays)-curable organopolysiloxane resin composition comprises (A) 100 parts by weight of an organopolysiloxane resin containing epoxy groups and aromatic hydrocarbon groups, (B) 0.05 to 20 parts by weight of a photo acid generator, (C) 0.01 to 20 parts by weight of a photosensitizer or photo-radical generator, and (D) 0 to 5,000 parts by weight of an organic solvent. An optical transmission component made of the above-mentioned composition cured by irradiation with active energy rays (for example, UV rays). A method for manufacturing an optical transmission component by irradiating the above-mentioned composition with active energy rays (for example, UV rays).

8 Claims, No Drawings

ACTIVE ENERGY RAY-CURABLE ORGANOPOLYSILOXANE RESIN COMPOSITION, OPTICAL TRANSMISSION COMPONENT, AND MANUFACTURING METHOD THEREOF

RELATED APPLICATIONS

This application claims priority to and all the advantages of International Patent Application No. PCT/JP2005/010293, filed on May 30, 2005, which claims priority to Japanese Patent Application No. JP 2004-160720, filed on May 31, 2004.

TECHNICAL FIELD

The present invention relates to an active energy ray-curable organopolysiloxane resin composition useful in the manufacture of optical transmission components, an optical transmission component made of a cured product obtained by irradiating the organopolysiloxane resin composition with active energy rays, and a manufacturing method for optical transmission components.

BACKGROUND OF THE INVENTION

Quartz and glass are used not only as optical fiber materials, but also as high-reliability optical materials for optical communications. However, because of the high temperature treatment these materials require and the inferior productivity they offer, there is a need for organic materials for communication elements possessing better durability and processability. Polyimides, which are organic materials with the highest reliability, are widely used as raw materials for electronic components. On the other hand, organopolysiloxanes have been attracting attention in the field of optoelectronics due to their superior optical transmittance, electric insulation properties, optical stability, thermal stability, etc. The physical properties required of optical transmission materials, such as the absence of absorption in the communication wavelength band of 1300 nm to 1660 nm and the absence of birefringence due to polymer chain orientation, as well as heat resistance, moisture absorption resistance, and water resistance, which are regarded as very important properties for device assembly, are being constantly improved primarily with the aid of the above-mentioned polyimide and organopolysiloxane-based materials.

Although there are well-known polymeric optical materials, especially materials used for optical waveguides, obtained by adding a catalytic amount of an onium salt-based photoinitiator to an organopolysiloxane produced from an organochlorosilane (for example, phenyltrichlorosilane, methyltrichlorosilane) and a hydroxyl-containing epoxy compound (for example, glycidyl alcohol) as raw materials and irradiating the mixture with light (see Japanese Unexamined Patent Application Publication No. (hereinafter referred to as JP Kokai) Hei 9-124793), such materials suffer from problems associated with their insufficient adhesion to substrates and the fact that they are easily hydrolysable due to the bonding of epoxy-containing organic groups by Si—O—C linkages. Radiation (for example, UV)-curable compositions containing (A) a hydrolysable silane represented by the general formula $R_mSi(X)_4$ (where R is a non-hydrolysable organic group, X is a hydrolysable group, and m is between 0 and 3) or products of its condensation (for example, a product of co-hydrolysis and condensation of phenyltrimethoxysilane, methyltrimethoxysilane, and dimethyldimethoxysilane), (B) an organic onium salt-containing radiation (for example, UV)-curable composition producing acidic active substances by absorbing UV rays, and, furthermore, (C) a condensed aromatic compound (for example, anthracene, anthraquinone) are known (see JP Kokai 2003-185860), but the problem with this type of compositions is that they tend to contain air bubbles in cured films due to condensation based curing unless they are combined with defoaming agents.

On the other hand, there are known radiation (for example, UV)-curable silicone compositions comprising (a) an alkoxy- and epoxy-containing organopolysiloxane, (b) a cationic photoinitiator (for example, an onium salt), and (c) a free radical photoinitiator (for example, benzoin, acetophenone) or a sensitizer (for example, thioxanthone). In addition, there are known release coating radiation-curable silicone-containing compositions comprising (A) a liquid cationic polymerizable organopolysiloxane (epoxy-containing organopolysiloxane), (B) a cationic polymerization photoinitiator with an onium salt structure, and (C) a sensitizer (naphthalene derivatives, anthracene derivatives, and phenanthrene derivatives), both of which are used for imparting peelability and release properties against tacky substances, in particular by coating paper with such compositions and allowing them to cure. Alkoxy- and epoxy-containing methylpolysiloxanes (a) are considered preferable for use in the former compositions and in the latter compositions it is considered preferable that cationic polymerizable organopolysiloxanes should be linear or branched, with at least 85 mol % of silicon-bonded monovalent hydrocarbon groups represented by methyl groups; the problem with these compositions, however, is that their cured products have insufficient shape-retaining properties, solvent resistance, and optical transmittance in the communication wavelength band and exhibit considerable changes in the index of refraction and optical transmittance upon exposure to elevated temperatures.

Thus, as a result of in-depth investigations aimed at developing an active energy ray-curable organopolysiloxane resin composition free of such problems, the present inventors invented, and filed a patent application for, an active energy ray-curable organopolysiloxane resin composition that quickly cures upon irradiation with active energy rays (for example, UV rays) and contains no air bubbles in its cured product, with the cured product having superior resistance to hydrolysis, shape-retaining properties, and solvent resistance, providing a high optical transmittance in the communication wavelength band, and exhibiting insignificant changes in its refractive index and optical transmittance upon exposure to elevated temperatures (Japanese Patent Application No. 2003-412452). Incidentally, when such a composition is applied to a substrate (for example, a silicon substrate) and cured by irradiation with UV rays, the cured product exhibits insufficient adhesion to the substrate (for example, a silicon substrate) and can be easily peeled from the substrate after storage for approximately 3 months or ageing at about 100° C., which is a cause for concern about the stability of product quality. Attempts have been made to reduce residual stress in cured films, use special priming treatment, and treat the substrates with alkali in order to improve adhesion to the substrates with which compositions comes in contact in the process of curing, but sufficient effects have not been obtained.

The present invention was made by discovering that adhesion is improved if the composition is combined with a photosensitizer or photo-radical generator.

SUMMARY OF THE INVENTION

It is an object of the present invention to provide an energy ray curable organopolysiloxane resin composition that offers superior adhesion to substrates, quickly cures upon irradiation with active energy rays, such as UV rays, and contains no air bubbles in its cured product, with the cured product having superior resistance to hydrolysis, shape-retaining properties, and solvent resistance, providing a high optical transmittance in the communication wavelength band, and exhibiting insignificant changes in its refractive index and optical transmittance upon exposure to elevated temperatures.

The present invention relates to:

[1] an active energy ray-curable organopolysiloxane resin composition comprising:

(A) an epoxy-containing organopolysiloxane resin represented by the average unit formula:

$$(R^1R^2R^9SiO_{1/2})_a(R^4R^5SiO_{2/2})_b(R^6SiO_{3/2})_c(SiO_{4/2})_d \qquad (1)$$

(wherein $R^1$, $R^2$, $R^3$, $R^4$, $R^5$, and $R^6$ are organic groups selected from $C_1$ to $C_6$ monovalent aliphatic hydrocarbon groups, $C_6$ to $C_{10}$ monovalent aromatic hydrocarbon groups, and epoxy-containing monovalent hydrocarbon groups, with siloxane units having epoxy-containing monovalent hydrocarbon groups accounting for 2 to 50 mol % per molecule and 15 mol % or more of all the organic groups represented by $C_6$ to $C_{10}$ monovalent aromatic hydrocarbon groups, $a+b+c+d=1$, $0 \leq a<0.4$, $0<b<0.5$, $0<c<1$, $0 \leq d<0.4$, and $0.1 \leq b/c \leq 0.3$) 100 parts by weight, (B) a photo acid generator 0.05 to 20 parts by weight, (C) a photosensitizer or a photo-radical generator 0.01 to 20 parts by weight, and (D) an organic solvent 0 to 5,000 parts by weight.

[2] The active energy ray-curable organopolysiloxane resin composition as recited in [1], wherein the composition is intended for use in an optical transmission component.

[3] The active energy ray-curable organopolysiloxane resin composition as recited in [2], wherein the optical transmission component is adhered to a substrate.

[4] The active energy ray-curable organopolysiloxane resin composition as recited in [2] or [3], wherein the optical transmission component is an optical waveguide.

[5] The active energy ray-curable organopolysiloxane resin composition as recited in any of claims 1 through 4, wherein the active energy rays are UV rays.

[6] An optical transmission component made up of a cured product obtained by irradiating the active energy ray-curable organopolysiloxane resin composition as recited in [1] with active energy rays.

[7] The optical transmission component as recited in [6], wherein the cured product is adhered to a substrate.

[8] The optical transmission component as recited in [6] or [7], wherein the active energy rays are UV rays.

[9] A method for manufacturing an optical transmission component, wherein (1) the active energy ray-curable organopolysiloxane resin composition as recited in [1] is applied to a substrate, (2) the applied active energy ray-curable organopolysiloxane resin composition is irradiated with active energy rays in order to cure it, and, if necessary, subjected to post-heating.

The active energy ray-curable organopolysiloxane resin composition of the present invention quickly cures upon irradiation with active energy rays, such as UV rays, has superior shape-retaining properties even in thin film form, and contains no air bubbles in its cured product, with the cured product possessing resistance to hydrolysis and solvent resistance. Specifically, it possesses sufficient elasticity and hardness such that it does not bend easily and there is practically no warpage or cracking. In addition, it has superior adhesion to substrates, with which it comes in contact in the process of curing. The cured product has a high optical transmittance in the communication wavelength band and a very small transmission loss. Controlling the index of refraction is easier in comparison with conventional compositions, and changes in its optical transmittance and index of refraction are very small even when it is exposed to elevated temperatures. The optical transmission component of the present invention contains no air bubbles, has superior resistance to hydrolysis, shape-retaining properties, and solvent resistance, provides a high optical transmittance in the communication wavelength band, and exhibits insignificant changes in its optical transmittance and index of refraction upon exposure to elevated temperatures. The optical transmission component formed on a substrate exhibits excellent adhesion to the substrate.

BEST MODE FOR CARRYING OUT THE INVENTION

The epoxy-containing organopolysiloxane resin represented by the average siloxane unit formula:

(wherein $R^1$, $R^2$, $R^3$, $R^4$, $R^5$, and $R^6$ are organic groups selected from $C_1$ to $C_6$ monovalent aliphatic hydrocarbon groups, $C_6$ to $C_{10}$ monovalent aromatic hydrocarbon groups, and epoxy-containing monovalent hydrocarbon groups, with siloxane units having epoxy-containing monovalent hydrocarbon groups accounting for 2 to 50 mol % per molecule and 15 mol % or more of all the organic groups represented by $C_6$ to $C_{10}$ monovalent aromatic hydrocarbon groups, $a+b+c+d=1$, $0 \leq a<0.4$, $0<b<0.5$, $0<c<1$, $0 \leq d<0.4$, and $0.1 \leq b/c \leq 0.3$) is the main ingredient of the active energy ray-curable organopolysiloxane resin composition of the present invention. Due to the epoxy groups it contains, the resin quickly cures upon irradiation with active energy rays, such as UV rays, electron beams or ionizing radiation, in the presence of (B) a photo acid generator and (C) a photo-sensitizer or a photo-radical generator. When the composition is in contact with a substrate (for example, a silicon substrate), irradiating it with active energy rays, such as UV rays, electron beams or ionizing radiation, causes the composition to cure and firmly adhere to the substrate.

In the epoxy-containing organopolysiloxane resin (A) represented by the average siloxane unit formula (1), the $(R^4R^5SiO_{2/2})$ units and $(R^6SiO_{3/2})$ units are essential, whereas the $(R^1R^2R^3SiO_{1/2})$ and $(SiO_{4/2})$ units are optional constituent units. Thus, there may be epoxy-containing organopolysiloxane resins comprising the following units:

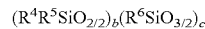

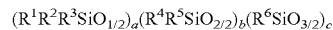

The subscript a is $0 \leq a<0.4$ because the molecular weight of the epoxy-containing organopolysiloxane resin (A) drops when there are too many $(R^1R^2R^3SiO_{1/2})$ units, and, when $(SiO_{4/2})$ units are introduced, the hardness of the cured product of the epoxy-containing organopolysiloxane resin (A) is markedly increased and the product may be easily rendered brittle. For this reason, the subscript d is $0 \leq d<0.4$, preferably, $0 \leq d < 0.2$, and even more preferably, $d=0$. In addition, the molar ratio b/c of the $(R^4R^5SiO_{2/2})$ units and $(R^6SiO_{3/2})$ units, which are essential constituent units, is not less than 0.01 and not more than 0.3. Deviation from this range in the manufacture of the epoxy-containing organopolysiloxane resin (A) may result in generation of insoluble side products, in making the product more prone to cracking due to decreased toughness, or in a decrease in the strength and elasticity of the product and making it more prone to scratching. The preferable range for the molar ratio b/c is not less than 0.01 and not more than 0.25, and an even more preferable range is not less than 0.02 and not more than 0.25. The epoxy-containing organopolysiloxane resin (A) contains the $(R^4R^5SiO_{2/2})$ units and $(R^6SiO_{3/2})$ units as essential constituent units, and its molecular structure is in most cases a network structure or a three-dimensional one because the molar ratio of b/c is not less than 0.01 and not more than 0.3.

The silicon-bonded $C_1$ to $C_6$ monovalent aliphatic hydrocarbon groups in component (A) are exemplified by methyl, ethyl, propyl, butyl, hexyl, and other monovalent saturated aliphatic hydrocarbon groups, and by vinyl, allyl, hexenyl, and other monovalent unsaturated aliphatic hydrocarbon groups. In addition, the silicon-bonded $C_6$ to $C_{10}$ monovalent aromatic hydrocarbon groups are exemplified by phenyl, tolyl, xylyl, and naphthyl. The index of refraction, which is an important optical characteristic, is regulated by changing the type of the monovalent hydrocarbon groups. When methyl and other monovalent aliphatic hydrocarbon groups are used as the primary substituent groups, the index of refraction tends to be less than 1.5, whereas using phenyl and other monovalent aromatic hydrocarbon groups as the primary substituent groups tends to set the index of refraction to 1.5 or more. The monovalent saturated aliphatic hydrocarbon groups are preferably methyl groups and the monovalent aromatic hydrocarbon groups are preferably phenyl groups. Vinyl groups are preferred when the composition contains monovalent unsaturated aliphatic hydrocarbon groups.

The monovalent aromatic hydrocarbon groups preferably constitute not less than 15 mol %, more preferably, not less than 20 mol %, and most preferably, not less than 25 mol % of all the organic groups in component (A). This is due to the fact that when the content of the monovalent aromatic hydrocarbon groups is below the lower limit of the range, the optical transmittance of the cured product of the active energy ray-curable organopolysiloxane resin composition of the present invention in the communication wavelength band decreases, and the cured product becomes prone to cracking as a result of a decrease in toughness.

In component (A), siloxane units having epoxy-containing monovalent hydrocarbon groups constitute 2 mol % to 50 mol %, preferably, 10 mol % to 40 mol %, and even more preferably, 15 mol % to 40 mol % of all the siloxane units. If there is less than 2 mol % of such siloxane units, the density of cross-linking during curing is low, making it impossible to obtain hardness that would be sufficient for an optical transmission component. On the other hand, an amount exceeding 50 mol % is unsuitable because it brings about a decrease in the optical transmittance and heat resistance of the cured product. In the epoxy-containing monovalent hydrocarbon groups, the epoxy groups are preferably bonded to silicon atoms through alkylene groups, such that these epoxy groups are not directly bonded to the silicon atoms.

The groups are exemplified by 3-(glycidoxy)propyl groups:

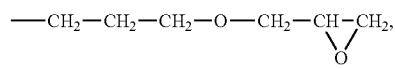

by 2-(glycidoxycarbonyl)propyl groups:

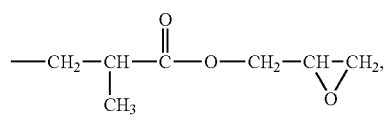

by 2-(3,4-epoxycyclohexyl)ethyl groups:

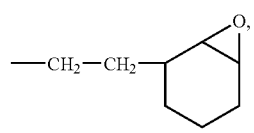

and by 2-(4-methyl-3,4-epoxycyclohexyl)propyl groups:

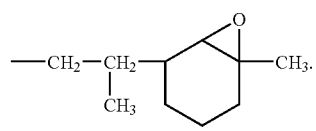

Specific examples of the epoxy-containing organopolysiloxane resin (A) include: organopolysiloxane resins comprising $(Me_2SiO_{2/2})$, $(PhSiO_{3/2})$, and $(E^1SiO_{3/2})$ units, organopolysiloxane resins comprising $(Me_3SiO_{1/2})$, $(Me_2SiO_{2/2})$, $(PhSiO_{3/2})$, and $(E^1SiO_{3/2})$ units, organopolysiloxane resins comprising $(Me_2SiO_{2/2})$, $(PhSiO_{3/2})$, $(E^1SiO_{3/2})$ and $(SiO_{4/2})$ units, organopolysiloxane resins comprising $(Me_2SiO_{2/2})$, $(PhSiO_{3/2})$, $(MeSiO_{3/2})$, and $(E^1SiO_{3/2})$ units, organopolysiloxane resins comprising $(Ph_2SiO_{2/2})$, $(PhSiO_{3/2})$, and $(E^1SiO_{3/2})$ units, organopolysiloxane resins comprising $(MePhSiO_{2/2})$, $(PhSiO_{3/2})$, and $(E^1SiO_{3/2})$ units, organopolysiloxane resins comprising $(Me_2SiO_{2/2})$, $(PhSiO_{3/2})$, and $(E^2SiO_{3/2})$ units, organopolysiloxane resins comprising $(Me_2SiO_{2/2})$, $(PhSiO_{3/2})$, and $(E^3SiO_{3/2})$ units, organopolysiloxane resins comprising $(Me_2SiO_{2/2})$, $(PhSiO_{3/2})$, and $(E^4SiO_{3/2})$ units, organopolysiloxane resins comprising $(MeViSiO_{2/2})$, $(PhSiO_{3/2})$, and $(E^3SiO_{3/2})$ units, organopolysiloxane resins comprising $(Me_2SiO_{2/2})$, $(PhSiO_{3/2})$, $(MeSiO_{3/2})$, and $(E^3SiO_{3/2})$ units, organopolysiloxane resins comprising $(Ph_2SiO_{2/2})$, $(PhSiO_{3/2})$, and $(E^3SiO_{3/2})$ units, organopolysiloxane resins comprising $(Me_2SiO_{2/2})$, $(Ph_2SiO_{2/2})$, and $(E^1SiO_{3/2})$, organopolysiloxane resins comprising $(Me_2SiO_{2/2})$, $(Ph_2SiO_{2/2})$, and $(E^3SiO_{3/2})$ units, organopolysiloxane resins comprising $(Me_2ViSiO_{1/2})$, $(Me_2SiO_{2/2})$, $(PhSiO_{3/2})$, and $(E^1SiO_{3/2})$ units, organopolysiloxane resins comprising $(Me_3SiO_{1/2})$, $(Ph_2SiO_{2/2})$, $(PhSiO_{3/2})$, and $(E^1SiO_{3/2})$ units, organopolysiloxane resins comprising $(Me_3SiO_{1/2})$, $(Me_2SiO_{2/2})$, $(PhSiO_{3/2})$, and $(E^3SiO_{3/2})$ units, organopolysiloxane resins comprising $(Me_2SiO_{2/2})$, $(PhSiO_{3/2})$, $(E^3SiO_{3/2})$, and $(SiO_{4/2})$ units, organopolysiloxane resins comprising $(Me_2SiO_{2/2})$, $(Ph_2SiO_{2/2})$, $(E^1SiO_{3/2})$, and $(SiO_{4/2})$ units, organopolysiloxane resins comprising ($Me_3SiO_{1/2}$), ($Me_2SiO_{2/2}$), ($PhSiO_{3/2}$), ($E^1SiO_{3/2}$), and ($SiO_{4/2}$) units, organopolysiloxane resins comprising ($Me_3SiO_{1/2}$), ($Me_2SiO_{2/2}$), ($PhSiO_{3/2}$), ($E^3SiO_{3/2}$), and ($SiO_{4/2}$) units [here, Me represents a methyl group, Vi represents a vinyl group, Ph represents a phenyl group, $E^1$ represents a 3-(glycidoxy)propyl group, $E^2$ represents a 2-(glycidoxycarbonyl)propyl group, $E^3$ represents a 2-(3,4-epoxycyclohexyl)ethyl group, and $E^4$ represents a 2-(4-methyl-3,4-epoxycyclohexyl)propyl group. Same below.]

The epoxy-containing organopolysiloxane resin (A) can be produced by well-known conventional manufacturing methods, such as, for example, the methods disclosed in JP Kokai Hei 6-298940.

For instance, there is a method, in which a silane of the formula $R^4R^5SiCl_2$ is subjected to co-hydrolysis and condensation with a silane of the formula $R^6SiCl_3$, methods, in which co-hydrolysis and condensation is conducted by combining these silanes, as the occasion demands, with a silane of the formula $R^1R^2R^3SiCl$ alone, with a silane of the formula $SiCl_4$ alone, or with both a silane of the formula $R^1R^2R^3SiCl$ and a silane of the formula $SiCl_4$; and methods, in which co-hydrolysis and condensation is conducted using silanes obtained by substituting chlorine atoms in the above-mentioned silanes to methoxy or ethoxy groups (in the formulas, $R^1$, $R^2$, $R^3$, $R^4$, $R^5$, and $R^6$ are organic groups selected from $C_1$ to $C_6$ monovalent aliphatic hydrocarbon groups, $C_6$ to $C_{10}$ monovalent aromatic hydrocarbon groups, and epoxy-containing monovalent hydrocarbon groups). In addition, there is a method, in which a methylphenylpolysiloxane resin containing silicon-bonded epoxy groups, such as 3-(glycidoxy)propyl, is produced by preparing a silanol-containing methylphenylpolysiloxane resin by co-hydrolysis and condensation of dimethyldichlorosilane and phenyltrichlorosilane or methyldichlorosilane, methyltrichlorosilane, and phenyltrichlorosilane, rendering the reaction system basic, and then conducting a condensation reaction by adding an epoxy-containing organotrialkoxysilane, such as 3-(glycidoxy)propyltrimethoxysilane. The subscripts a, b, c, and d in the average unit formula (1) can be adjusted by adjusting the amount of the loaded raw silanes and their mole ratios.

Incidentally, depending on the method of preparation and conditions, the organopolysiloxane resins may have residual hydroxyl and alkoxy groups bonded to silicon atoms. The amount of such substituent groups has to be reduced as much as possible because they negatively affect the storage stability of the organopolysiloxane resins and act as a factor that lowers the heat resistance of the cured organopolysiloxane resins. The content of these substituent groups can be reduced, for instance, by conducting a dehydration condensation reaction or dealcoholation condensation reaction by heating the organopolysiloxane resins in the presence of a minute amount of potassium hydroxide. The desirable range for the content of these substituent groups is preferably not more than 2 mol %, and even more preferably, not more than 1 mol %.

While there are no particular limitations concerning the number-average molecular weight of the epoxy-containing organopolysiloxane resins (A), if the toughness of the cured product and its solubility in organic solvents are taken into consideration, the molecular weight is preferably not less than $10^3$ and not more than $10^6$. It is possible to use a combination of two or more kinds of such epoxy-containing organopolysiloxane resins with different content and type of the epoxy-containing organic groups and monovalent hydrocarbon groups or with different molecular weights.

So long as the photo acid generator (B) is used as a photo acid generator for epoxy-containing organopolysiloxanes, there are no particular limitations concerning the photo acid generator, which is exemplified by sulfonium salts, iodonium salts, selenonium salts, phosphonium salts, diazonium salts, paratoluene sulfonates, trichloromethyl-substituted triazines, and trichloromethyl-substituted benzenes.

Salts represented by the formula $R^7_3S^+X^-$ are preferable as the sulfonium salts. In the formula, $R^7$ stands for methyl, ethyl, propyl, butyl, and other $C_1$ to $C_6$ alkyl groups; phenyl, naphthyl, biphenyl, tolyl, propylphenyl, decylphenyl, dodecylphenyl, and other $C_{1-24}$ aryl group or substituted aryl groups, and $X^-$ in the formula represents $SbF_6^-$, $AsF_6^-$, $PF_6^-$, $BF_4^-$, $B(C_6F_5)_4^-$, $HSO_4^-$, $ClO_4^-$, $CF_3SO_3^-$ and other non-nucleophilic non-basic anions. Salts represented by the formula $R^7_2I^+X^-$ are preferable as the iodonium salts, with the $R^7$ and $X^-$ in the formula being the same as above. Salts represented by the formula $R^7_3Se^+X^-$ are preferable as the selenonium salts, with the $R^7$ and $X^-$ in the formula being the same as above. Salts represented by the formula $R^7_4P^+X^-$ are preferable as the phosphonium salts, with the $R^7$ and $X^-$ in the formula being the same as above. Salts represented by the formula $R^7N_2^+X^-$ are preferable as the diazonium salts, with the $R^7$ and $X^-$ in the formula being the same as above. Compounds represented by the formula $CH_3C_6H_4SO_3R^3$ are preferable as the paratoluene sulfonates, with the $R^8$ in the formula standing for organic groups including electron-attracting groups, such as benzoylphenylmethyl groups, phthalimide groups, etc. Compounds represented by $[CCl_3]_2C_3N_3R^9$ are preferable as the trichloromethyl-substituted triazines, with the $R^9$ in the formula standing for phenyl, substituted or unsubstituted phenylethyl, substituted or unsubstituted furanylethynyl, and other electron-attracting groups. Compounds represented by $CCl_3C_6H_3R^7R^{10}$ are preferable as the trichloromethyl-substituted benzenes, with the $R^7$ in the formula being the same as above and the $R^{10}$ standing for halogen groups, halogen-substituted alkyl groups, and other halogen-containing groups.

If availability and miscibility with the epoxy-containing organopolysiloxane resins (A) are taken into consideration, then triphenylsulfonium tetrafluoroborate, triphenylsulfonium hexafluoroantimonate, triphenylsulfonium triflate, tri(p-tolyl)sulfonium hexafluorophosphate, p-tertiary butylphenyldiphenylsulfonium hexafluoroantimonate, diphenyliodonium tetrafluoroborate, diphenyliodonium hexafluoroantimonate, p-tertiary butylphenylbiphenyliodonium hexafluoroantimonate, di(p-tertiary butylphenyl)iodonium hexafluoroantimonate, bis(dodecylphenyl)iodonium hexafluoroantimonate, triphenylselenonium tetrafluoroborate, tetraphenylphosphonium tetrafluoroborate, tetraphenylphosphonium hexafluoroantimonate, p-chlorophenyldiazonium tetrafluoroborate, benzoylphenylmethylparatoluene sulfonate, bistrichloromethylphenyltriazine, bistrichloromethylfuranyltriazine, and p-bistrichloromethylbenzene are suggested as the preferred photo acid generators. Among the above, triphenylsulfonium tetrafluoroborate, di(p-tertiary butylphenyl)iodonium hexafluoroantimonate, bis(dodecylphenyl)iodonium hexafluoroantimonate, and p-chlorophenyldiazonium tetrafluoroborate are even more preferable.

While commonly known carbonyl-containing aromatic compounds can be used as the photosensitizers or photoradical generators of Component (C), there are no particular limitations concerning these compounds so long as they produce photosensitizing effects and are miscible with the epoxy-containing organopolysiloxane resin (A) or soluble in Component (D). They are specifically exemplified by isopropyl-9H-thioxanthen-9-one, xanthone, anthracene, anthrone, anthraquinone, benzophenone, 4,4'-bis(dimethylamino)benzophenone, diethoxyacetophenone, 2,2-dimethoxy-1,2-diphenylethan-1-one, 1-hydroxy-cyclohexyl-phenylketone, 2-hydroxy-2-methyl-1-phenylpropane-1-one, 2-methyl-1[4-(methylthio)phenyl]-2-morpholinopropan-1-one, 1-[4-(2-hydroxyethoxy)phenyl]-2-hydroxy-2-methyl-1-propan-1-one, 2-benzyl-2-dimethylamino-1-(4-morpholinophenyl)butane-1, and bis(2,4,6-trimethylbenzoyl)phenylphosphine oxide. Among the above, isopropyl-9H-thioxanthene-9-one, anthrone, 1-hydroxy-cyclohexyl-phenylketone, and 2-hydroxy-2-methyl-1-phenylpropane-1-one are more preferable.

Although the organic solvent (D) is not an essential component, it is necessary if the epoxy-containing organopolysiloxane resin (A) is solid or in the form of a viscous liquid at the temperature, at which molding is carried out, or when the epoxy-containing organopolysiloxane resin (A) is molded into a film. In addition, when the photo acid generator (B) is not soluble in the epoxy-containing organopolysiloxane resins (A), the solvent is necessary in order to dissolve it. While there are no particular limitations concerning the type of the organic solvent (D) so long as it can dissolve the epoxy-containing organopolysiloxane resin (A), photo acid generator (B), and the photosensitizer or photo-radical generator (C), a solvent with a boiling point of 80° C. to 200° C. is recommended. The solvent is specifically exemplified by isopropyl alcohol, tertiary butyl alcohol, methylethylketone, methylisobutylketone, acetylacetone, anisole, toluene, xylene, mesitylene, chlorobenzene, ethylene glycol dimethyl ether, ethylene glycol diethyl ether, diethylene glycol dimethyl ether, ethoxy-2-propanol acetate, methoxy-2-propanol acetate, octamethylcyclotetrasiloxane, and hexamethyldisiloxane. Such an organic solvent can be used singly or as a mixture of two or more solvents.

The active energy ray-curable organopolysiloxane resin composition of the present invention comprises (A) 100 parts by weight of the above-described epoxy-containing organopolysiloxane resin, (B) 0.05 to 20 parts by weight of a photo acid generator, (C) a photosensitizer or photo-radical generator, and (D) 0 to 5,000 parts by weight of an organic solvent. There is no need to add Component (D) when Component (A) is liquid, or when the miscibility of Component (A) with Component (B) and Component (C) is extremely good. When the amount of the Component (B) is less than 0.05 parts by weight, curing is insufficient, and amounts exceeding 20 parts by weight are unsuitable because of the deterioration of optical characteristics due to the presence of residual catalysts. When the amount of the added Component (C) is less than 0.01 parts by weight, curing is insufficient and adhesion is inferior. On the other hand, an amount exceeding 20 parts by weight is unsuitable because of the deterioration of optical characteristics due to the presence of residual catalysts. In addition, adding Component (D) in an amount exceeding 5000 parts by weight is unsuitable because it becomes difficult to obtain high-quality thin films during the manufacture of optical transmission components, as described below. Although the amount of the added Component (D) varies depending on its type and the solubility and consistency of Component (C), Component (B) and Component (A), it is normally in the range of 1 to 1000 parts by weight and preferably in the range of 1 to 500 parts by weight.

When the active energy ray-curable organopolysiloxane resin composition of the present invention is used to make cured films or optical transmission components, the composition is preferably liquid at room temperature and, especially preferably, has a viscosity of 20 to 10,000 mPa·s at 25° C. Deviation from this range brings about a decrease in processability and makes obtaining thin films with high optical quality more difficult.

The index of refraction of the cured active energy ray-curable resin composition of the present invention can be precisely adjusted by modifying the molar ratio of the silicon-bonded groups, i.e. monovalent aliphatic hydrocarbon groups (typically methyl groups) and monovalent aromatic hydrocarbon groups (typically phenyl groups), in the epoxy-containing organopolysiloxane resin (A). Increasing the proportion of the monovalent aromatic hydrocarbon groups makes the index of refraction higher, and when the number of monovalent aliphatic hydrocarbon groups is increased, the index of refraction becomes lower. When optical waveguides are fabricated from the active energy ray-curable organopolysiloxane resin composition of the present invention, the index of refraction of the cured organopolysiloxane resin used for the core has to be higher than that of the cured organopolysiloxane resin used for the cladding, which is why the amount of monovalent aromatic hydrocarbon groups in the organopolysiloxane resin composition used for the core is made higher than that of the organopolysiloxane resin composition used for the cladding. In order to do so, it is possible to use two kinds of organopolysiloxane resin containing different molar proportions of [monovalent aliphatic hydrocarbon groups]/[monovalent aromatic hydrocarbon groups] separately for the core and for the cladding, and/or mix the two kinds of organopolysiloxane resin in different proportions.

Optical transmission components made of cured epoxy-containing organopolysiloxane resins (A) represented by the general formula (1) of the present invention have superior shape-retaining properties even in thin film form. Specifically, they possess sufficient elasticity and hardness such that they do not bend easily and there is practically no warpage and cracking. Birefringence of such cured films is negligibly small according to the refractive index measurement by a prism coupling technique. Optical transmission components formed on substrates (for example, silicon substrates) from the cured epoxy-containing organopolysiloxane resin (A) represented by the general formula (1) of the present invention exhibit excellent adhesion to substrates (for example, silicon substrates).

The optical transmission component of the present invention can be used both for passive components and active components. The passive transmission components are specifically exemplified by non-branched optical waveguides, branched optical waveguides, multiplexer/demultiplexers, optical adhesives, etc., and the active transmission components are exemplified by waveguide-type optical switches, waveguide-type optical modulators, optical attenuators, optical amplifiers, etc.

Methods used in the manufacture of optical transmission components from the cured active energy ray-curable epoxy-containing organopolysiloxane resin compositions of the present invention are explained below.

The optical transmission components can be manufactured by following steps 1) and 2) described below.

First of all, 1) after uniformly applying the active energy ray-curable organopolysiloxane resin composition according to claim 1 to a substrate, the organic solvent (D) is removed, as necessary, by air drying or heating, thereby producing a thin film of a uniform thickness made up of an epoxy-containing organopolysiloxane resin (A), a photo acid generator (B), and a photosensitizer or photo-radical generator (C). Materials used to make the substrate, which preferably has a smooth surface and is stable to solvents, active energy rays used for curing, and heat, are exemplified by silicon wafers, glass, ceramics, and heat-resistant plastics. The spin-coating technique is commonly used for coating, with the temperature of the subsequent heating being preferably in the range of from not less than 30° C. to not more than 120° C. Subsequently, 2) the resultant thin film is cured by irradiating it with active energy rays. The active energy rays used in such a case are exemplified by UV rays, electron beams, and ionizing radiation, with UV rays being preferable from the standpoint of safety and equipment costs. Suitable UV rays sources include high-pressure mercury lamps, medium-pressure mercury lamps, Xe—Hg lamps, and deep-UV lamps. The irradiation dose of the UV rays is preferably in the range of 100 to 8000 mJ/cm². Depending on the type of the active energy ray-curable organopolysiloxane used, it may sometimes be impossible to accomplish curing using the active energy rays alone. In such a case, after irradiation with active energy rays, curing can be finished by heating (called "post-heating" below) the thin film. The preferable temperature range for such post-heating is 50° C. to 200° C.

Thus, an optical transmission component of high transmittance in a designated wavelength region is produced by 1) applying the active energy ray-curable organopolysiloxane resin composition to a substrate, 2) irradiating the applied active energy ray-curable organopolysiloxane resin composition with active energy rays, such as UV rays, and, if necessary, subjecting it to post-heating. In addition, a typical optical transmission component, such as an optical waveguide, can be produced by repeating step 1) and step 2). An example of the typical manufacturing method used for optical waveguides is shown below. First of all, an active energy ray-curable organopolysiloxane resin composition used for the cladding is spin-coated on a substrate and the coating is cured by irradiation with active energy rays, thereby forming a bottom cladding layer. Next, an active energy ray-curable organopolysiloxane resin composition used for the core is spin-coated on the bottom cladding layer and the resultant coating is cured by irradiation with active energy rays to form a core layer which, upon shaping as necessary, is used as a core layer possessing a higher index of refraction than the cladding layer. In order to impart the desired shape to the core layer, in other words, to pattern it, the core layer is irradiated with active energy rays through a photo-mask having an outline of the shape, and, if necessary, subjected to the above-described post-heating, whereupon unexposed portions can be dissolved and removed using an organic solvent. The organic solvent (C) can be used as the organic solvent used for this purpose. An optical waveguide comprising a cladding layer, a core layer, and another cladding layer is obtained when an active energy ray-curable organopolysiloxane resin composition used for the cladding is applied on top of the core layer, in other words, on top of the patterned core layer and the bottom cladding layer. The top cladding layer is formed via curing by irradiation with active energy rays. In the above-mentioned manufacturing method, the cured active energy ray-curable organopolysiloxane resin composition used for the core has a higher index of refraction than the cured active energy ray-curable organopolysiloxane resin composition used for the cladding. The solvent-casting technique can be used instead of spin coating during the application of the active energy ray-curable organopolysiloxane resin composition.

EXAMPLES

Working examples and comparative examples are provided herein below in order to specifically explain the present invention. The present invention, however, is not limited to the working examples.

The structure of the epoxy-containing organopolysiloxane resins used in the examples was determined by conducting $^{13}C$ NMR and $^{29}Si$ NMR measurements.

The number-average molecular weight of the epoxy-containing organopolysiloxane resins was calculated using GPC based on comparison with polystyrene standards.

The content of silanol and methoxy groups was measured with the help of the $^{29}Si$ NMR method. A Deep UV irradiation apparatus from Yamashita Denso Corporation was utilized as an active energy ray source for curing the active energy ray-curable epoxy-containing organopolysiloxane resin compositions.

In order to measure the indices of refraction of the cured products, a cured product was cut into cubes with an edge of 5 mm, the faces of the cubes were polished, and the index of refraction was measured using a digital precision refractometer, the KPR-200, from Kalnew Optical Industrial Co., Ltd. in the wavelength range from 435 nm to 1550 nm.

The optical transmittance of a cured product was determined by cutting and polishing the cured product to produce plates with a thickness of 3 mm and using the plates to conduct measurements using a UV-visible spectrophotometer in the wavelength region of 300 to 2500 nm.

Film thickness was determined using the Tencor Alphastep 200.

Additionally, Me, Ph, Vi, and $E^8$ in the average siloxane unit formulas below represent, respectively, methyl, phenyl, vinyl, and 2-(3,4-epoxycyclohexyl) ethyl groups.

Reference Example 1

Preparation of Epoxy-Containing Organopolysiloxane Resin (A1)

A solution of a silanol-containing methylphenylpolysiloxane resin was prepared by subjecting a mixture of 505 g phenyltrichlorosilane and 47 g dimethyldichlorosilane to co-hydrolysis and condensation in a mixture of 500 g toluene, 142 g 2-propanol, and 142 g water. The solution was neutralized with an aqueous solution of sodium hydrogencarbonate and washed with water, which was subsequently completely removed under heating. 226 g 2-(3,4-epoxycyclohexyl)ethyltrimethoxysilane and 2 g of a 50 wt % aqueous solution of potassium hydroxide were added to the remaining solution, and water, methanol and toluene were removed by azeotropic dehydration under heating and agitation. In the process, an appropriate amount of toluene was added to maintain the solid matter concentration at about 50 wt %. Upon termination of the dehydration condensation reaction of silanol groups, the solution was additionally refluxed for several hours to complete the equilibration reaction. After cooling down, a toluene solution (solid matter content: 499 g) of an epoxy-containing organopolysiloxane resin with an average siloxane unit formula of $[Me_2SiO_{2/2}]_{0.10}[PhSiO_{3/2}]_{0.65}[E^3SiO_{3/2}]_{0.25}$ was obtained by neutralizing the reaction system with a solid acidic adsorbent and filtering off the adsorbent. The number-average molecular weight of the epoxy-containing organopolysiloxane resin was 2500, the phenyl group content was 59 mol %, and the total content of silanol and methoxy groups was 0.8 mol %. In order to use it in the working examples below, the toluene was removed.

Reference Example 2

Preparation of Epoxy-Containing Organopolysiloxane Resin (A2)

With the exception of using 315 g phenyltrichlorosilane, 191 g methyltrichlorosilane, 55 g dimethyldichlorosilane, and 262 g 2-(3,4-epoxycyclohexyl)ethyltrimethoxysilane as the starting raw materials, a toluene solution (solid matter content: 490 g) of an epoxy-containing organopolysiloxane resin with an average unit formula of $[Me_2SiO_{2/2}]_{0.10}[MeSiO_{3/2}]_{0.30}[PhSiO_{3/2}]_{0.35}[E^3SiO_{3/2}]_{0.25}$ was obtained by conducting reactions in the same manner as in Reference Example 1. The number-average molecular weight of the epoxy-containing organopolysiloxane resin was 3700, the phenyl group content was 32 mol %, and the total content of silanol and methoxy groups was 0.9 mol %. In order to use it in the working examples below, the toluene was removed.

Working Example 1

UV-curable epoxy-containing organopolysiloxane resin compositions 1 to 10 used for the cladding were prepared by mixing the epoxy-containing organopolysiloxane resin (A2) obtained in Reference Example 2 as Component (A), p-tolyldodecylphenyliodonium hexafluoroantimonate as Component (B), isopropyl-9H-thioxanthene-9-one (ITX), xanthone, anthrone, benzophenone, 4,4'-bis(dimethylamino)benzophenone (Michler's ketone), diethoxyacetophenone, and products from Ciba Specialty Chemicals such as Darocure 1173 (2-hydroxy-2-methyl-1-phenylpropane-1-one), Irgacure 184 (1-hydroxy-cyclohexyl-phenylketone), Irgacure 369 [2-benzyl-2-dimethylamino-1-(4-morpholinophenyl)-butanone-1] or Irgacure 651 (2,2-dimethoxy-1,2-diphenylethane-1-one) as Component (C), and anisol as Component (D) in a weight proportion of 100:3:0.6:40. In a closed-chamber system, the above-mentioned UV-curable epoxy-containing organopolysiloxane resin compositions 1 to 10 were spin coated on a silicon substrate by adjusting the frequency of rotation in the range from 100 to 1000 rpm in a stepwise manner, whereupon the specimens were allowed to stand for 5 min at 80° C. in order to eliminate surface tack. Cured products of the respective epoxy-containing organopolysiloxane resins with a uniform thickness of 50 μm were obtained by irradiating the thin films on the silicon substrates with UV rays at 1 J/cm² and heating them for 5 min at 80° C. Post-heating was carried out by placing the cured products formed on the silicone substrates on a hot plate heated to 100° C., 120° C., and 140° C. for 1 min. Results obtained by observing peeling of the cured products from the silicon substrate are shown in Table 1.

Comparative Example 1

A UV-curable epoxy-containing organopolysiloxane resin composition for the cladding (Comparative Composition 1) was prepared by mixing the epoxy-containing organopolysiloxane resin (A2) obtained in Reference Example 2 as Component (A), p-tolyldodecylphenyliodonium hexafluoroantimonate as Component (B), and anisole as Component (D) in a weight proportion of 100:3:40. A film of cured epoxy-containing organopolysiloxane resin with a thickness of 50 μm adhered to a silicone substrate was obtained by spin coating the composition on a silicon substrate in the same manner as in Working Example 1, irradiating it with UV rays, and heating it. In the same manner as in Working Example 1, the cured product adhered to the silicon substrate was subjected to post-heating and the result obtained by observing the peeling of the cured product from the silicon substrate was listed in Table 1.

TABLE 1

| Peeling Of Cured Cladding Composition | | |
|---|---|---|
| | Component (C) | Peeling |
| Composition 1 | ITX | None |
| Composition 2 | Xanthone | None |
| Composition 3 | Anthrone | None |
| Composition 4 | Benzophenone | None |
| Composition 5 | 4,4'-bis(dimethylamino)benzophenone | None |
| Composition 6 | Diethoxyacetophenone | None |
| Composition 7 | Darocure 1173 | None |
| Composition 8 | Irgacure 184 | None |
| Composition 9 | Irgacure 369 | None |
| Composition 10 | Irgacure 651 | None |
| Comparative Composition 1 | — | Yes |

As shown in Table 1, the cured product of Comparative Composition 1 (which contained neither photosensitizers nor photo-radical generators) exhibited peeling during post-heating, whereas the cured products of compositions 1 through 10 of Working Example 1, which contained photo-radical generators or photosensitizers, exhibited no peeling during post-heating, which confirmed that the addition of photo-radical generators or photosensitizers improved adhesion to silicon substrates.

Working Example 2

UV-curable epoxy-containing organopolysiloxane resin compositions 11 through 15 used for the core were prepared by mixing the epoxy-containing organopolysiloxane resin (A1) obtained in Reference Example 1 with the epoxy-containing organopolysiloxane resin (A2) obtained in Reference Example 2 in a weight proportion of 7/3 as Component (A), p-tolyldodecylphenyliodonium hexafluoroantimonate as Component (B), ITX, xanthone, anthrone, Darocure 1173 or Irgacure 184 as Component (C), and anisole as Component (D) in a weight proportion of 100:3:0.6:40. Anisole was removed in vacuo from these organopolysiloxane resin compositions 11 through 15 in polytetrafluoroethylene resin cups and the compositions were shaped into disks with a thickness of 1 cm, whereupon cured products of the epoxy-containing organopolysiloxane resins were obtained by irradiating the disks with UV rays at 10 J/cm² from above and from below. The cured products were cut into pieces and polished, producing test specimens, whose optical transmittance and indices of refraction were measured and listed in Table 2. The numerical values listed in the Table are values obtained at 1550 nm. In addition, the test specimens did not contain air bubbles. The cured products had a high optical transmittance in the communication wavelength band and a very small transmission loss. Changes in their optical transmittance and indices of refraction were very small even when exposed to elevated temperatures.

Comparative Example 2

A UV-curable epoxy-containing organopolysiloxane resin composition (Comparative Composition 2) was prepared by mixing a mixture produced by mixing the epoxy-containing organopolysiloxane resin (A1) obtained in Reference Example 1 with the epoxy-containing organopolysiloxane resin (A2) obtained in Reference Example 2 in a weight proportion of 7/3 as Component (A), p-tolyldodecylphenyliodonium hexafluoroantimonate as Component (B), and anisole as Component (D) in a weight proportion of 100:3:40. The Comparative Composition 2 was cured in the same manner as in Working Example 2, producing a cured product of epoxy-containing organopolysiloxane resin. The optical transmittance and index of refraction of the cured product were measured and the results were listed in Table 2.

Working Example 3

In a closed-chamber system, the UV-curable epoxy-containing organopolysiloxane resin composition 1 used for the cladding (contained ITX as Component (C)), which had been prepared in Working Example 1, was spin coated on a silicon substrate by increasing the frequency of rotation in the range of from 100 to 1000 rpm in a stepwise manner, whereupon the specimens were allowed to stand for 5 min at 80° C. in order to eliminate surface tack. A thin film of the cured epoxy-containing organopolysiloxane resin with a uniform thickness of 50 μm was obtained by irradiating the thin film on the silicon substrate with UV rays at 1 J/cm² and then heating it for 5 min at 80° C. Next, the cured thin film was used as bottom cladding layer, on which the UV-curable epoxy-containing organopolysiloxane resin composition 11 used for the core (contained ITX as Component (C)) prepared in Working Example 2 was spin coated under the same conditions as described above, whereupon the specimen was allowed to stand for 5 min at 80° C. in order to eliminate surface tack. The uncured film of the organopolysiloxane resin composition 11 was irradiated with UV rays at 1.0 J/cm² through a glass mask having a rectangular-shaped optical path with a line width of 50 μm and a length of 5 cm and then heated for 5 min at 80° C., to cure the exposed portions. Core patterns of cured epoxy-containing organopolysiloxane resin with a uniform thickness of 50 μm, a line width of 50 μm, and a length of 5 cm were prepared by dissolving and removing unexposed portions with methylisobutylketone. The UV-curable epoxy-containing organopolysiloxane resin composition 1 used for the cladding (contained ITX as Component (C)) was spin coated on the fabricated core patterns and the bottom cladding layer and irradiated with UV rays. The UV-curable epoxy-containing organopolysiloxane resin composition 1 was once again spin coated on the resulting coating and cured by UV irradiation at 3 J/cm² and subsequent heating for 5 min at 80° C. to obtain a channel optical waveguide with a total thickness of 150 μm on a silicon substrate. It was confirmed that the bottom cladding layer of the channel optical waveguide was firmly adhered to the silicon substrate and no peeling occurred after post-heating under the same conditions as in Working Example 1, which indicated excellent adhesion to the silicon substrate. Next, channel optical waveguides were fabricated under the same conditions as above from UV-curable epoxy-containing organopolysiloxane resin compositions 2, 3, 7, and 8 used for the cladding (containing xanthone, anthrone, Darocure 1173, or Irgacure 184 as Component (C)) instead of UV-curable epoxy-containing organopolysiloxane resin composition 1 used for the cladding (containing ITX as Component (C)). It was confirmed that the bottom cladding layers of the channel optical waveguides exhibited no peeling after post-heating under the same conditions as in Working Example 1, which indicated excellent adhesion to the silicon substrates. In addition, the fact that the cured exposed portions could not be dissolved with methylisobutylketone while the unexposed portions were dissolved and removed with methylisobutylketone indicated that the cured products possessed solvent resistance. The cured layers did not contain air bubbles.

Comparative Example 3

An attempt to fabricate a channel optical waveguide in the same manner as in Working Example 3 using the UV-curable epoxy-containing organopolysiloxane resin composition used for the cladding prepared in Comparative Example 1 (Comparative Composition 1) and UV-curable epoxy-containing organopolysiloxane resin composition 11 used for the core, which had been prepared in Working Example 2 and contained ITX as component (C), was unsuccessful because during fabrication the bottom cladding layer peeled from the silicon substrate and this made it impossible to fabricate a channel optical waveguide.

Working Example 4

In a closed-chamber system, the UV-curable epoxy-containing organopolysiloxane resin composition 1 used for the cladding (contained ITX as Component (C)), which had been prepared in Working Example 1, was spin coated on a silicon substrate by increasing the frequency of rotation in the range of from 100 to 1000 rpm in a stepwise manner, whereupon the specimens were allowed to stand for 5 min at 80° C. in order to eliminate surface tack. Cured thin films of the epoxy-containing organopolysiloxane resin with a uniform thickness of 50 μm were obtained by irradiating the thin films on the silicon substrates with UV rays at 1 J/cm² and then heating them for 5 min at 80° C. Next, the cured thin films attached to the silicon substrates were used as bottom cladding layers, on which the UV-curable epoxy-containing organopolysiloxane resin compositions 11 through 15 used for the core, which had been prepared in Working Example 2, were spin coated under the same conditions as described above, and the specimens were allowed to stand for 5 min at 80° C. in order to eliminate surface tack. The thin films were irradiated with UV rays in the range of from 1.0 to 1.25 J/cm² through a glass mask having a rectangular-shaped optical path with a line width of 50 μm and a length of 5 cm and then heated for 5 min at 80° C. to cure the exposed portions. Core pattern of cured epoxy-containing organopolysiloxane resin with a uniform thickness of 50 μm, a line width of 50 μm, and a length of 5 cm was prepared by dissolving and removing unexposed portions with methylisobutylketone. Table 2 lists patterning properties such as the lowest amount of UV rays, at which the cross-section of the patterned cores became rectangular. In addition, the fact that the cured exposed portions could not be dissolved with methylisobutylketone while the unexposed portions were dissolved and removed with methylisobutylketone indicated that the cured products possessed solvent resistance. The cured layers did not contain air bubbles. The core pattern did not lose its rectangular shape even after post-heating to 140° C., which indicated superior shape-retaining characteristics.

Comparative Example 4

Core patterns were formed on bottom cladding layers under the same conditions as in Working Example 4 except for using the UV-curable epoxy-containing organopolysiloxane resin composition used for the core prepared in Comparative Example 2 (Comparative Composition 2) instead of the UV-curable epoxy-containing organopolysiloxane resin compositions 11 through 15 used for the core. The resultant patterning properties are listed in Table 2.

TABLE 2

Characteristics of Cured Cladding Compositions

|  | Component (C) | Patterning Properties | Index of refraction | Optical Transmittance (%) |
|---|---|---|---|---|
| Composition 11 | ITX | 0.5 | 1.520 | 95.1 |
| Composition 12 | Xanthone | 1.0 | 1.520 | 94.7 |
| Composition 13 | Anthrone | 0.5 | 1.519 | 95.4 |
| Composition 14 | Darocure 1173 | 1.25 | 1.519 | 95.4 |
| Composition 15 | Irgacure 184 | 1.0 | 1.520 | 95.5 |
| Comparative Composition 2 | — | 1.25 | 1.520 | 95.8 |

*The "patterning properties" column shows the lowest irradiation dose of UV rays in J/cm², at which the cross-section of the patterned cores became rectangular.

As shown in Table 2, the UV-curable epoxy-containing organopolysiloxane resin compositions 11 through 15 used for the core, which contained photosensitizers or photo-radical generators, permitted fabrication of core patterns using irradiation with the same as or lower dose of UV rays required for the UV-curable epoxy-containing organopolysiloxane resin composition (Comparative Composition 2), which contained neither photosensitizers nor photo-radical generators.

The indices of refraction and optical transmittances of the cured UV-curable epoxy-containing organopolysiloxane resin compositions 11 through 15 used for the core, which contained photosensitizers or photo-radical generators, were practically the same as the index of refraction and optical transmittance of the UV-curable epoxy-containing organopolysiloxane resin composition (Comparative Composition 2), which contained neither photosensitizers nor photo-radical generators. These results indicate that the photosensitizers and photo-radical generators had practically no influence on the optical characteristics.

INDUSTRIAL APPLICABILITY

The active energy ray-curable organopolysiloxane resin composition of the present invention is extremely useful in the manufacture of optical transmission components, such as optical waveguides. The optical transmission component of the present invention is suitable for use as a material for optical integrated circuits or material for optical communications. The manufacturing method for the optical transmission component of the present invention is useful in the manufacture of optical transmission components, especially optical transmission components adhered to substrates.

The invention claimed is:

1. An active energy ray-curable organopolysiloxane resin composition comprising:
   (A) 100 parts by weight of an epoxy-containing organopolysiloxane resin represented by the average siloxane unit formula:

$$(R^1R^2R^3SiO_{1/2})_a(R^4R^5SiO_{2/2})_b(R^6SiO_{3/2})_c(SiO_{4/2})_d \quad (1)$$

wherein $R^1$, $R^2$, $R^3$, $R^4$, $R^5$, and $R^6$ are organic groups selected from $C_1$ to $C_6$ monovalent aliphatic hydrocarbon groups, $C_6$ to $C_{10}$ monovalent aromatic hydrocarbon groups, and epoxy-containing monovalent hydrocarbon groups, with siloxane units having epoxy-containing monovalent hydrocarbon groups accounting for 2 to 50 mol % per molecule and 15 mol % or more of all the organic groups represented by $C_6$ to $C_{10}$ monovalent aromatic hydrocarbon groups, $a+b+c+d=1$, $0 \leq a < 0.4$, $0 < b < 0.5$, $0 < c < 1$, $0 \leq d < 0.4$, and $0.1 \leq b/c \leq 0.3$,
   (B) 0.05 to 20 parts by weight of a photo acid generator,
   (C) 0.01 to 20 parts by weight of a photosensitizer or a photo-radical generator, and
   (D) 0 to 5,000 parts by weight of an organic solvent.

2. An optical transmission component made from the active energy ray-curable organopolysiloxane resin composition recited in claim 1.

3. The optical transmission component as recited in claim 2 wherein the component is adhered to a substrate.

4. The optical transmission component as recited in claim 2 wherein the component is an optical waveguide.

5. The active energy ray-curable organopolysiloxane resin composition as recited in claim 1, wherein the active energy rays are represented by UV rays.

6. An optical transmission component made up of a cured product obtained by irradiating the active energy ray-curable organopolysiloxane resin composition as recited in claim 1 with active energy rays.

7. The optical transmission component as recited in claim 6, wherein the cured product is adhered to a substrate.

8. A method for manufacturing an optical transmission component, wherein (1) the active energy ray-curable organopolysiloxane resin composition as recited in claim 1 is applied to a substrate, (2) the applied active energy ray-curable organopolysiloxane resin composition is irradiated with active energy rays in order to cure it, and, if necessary, subjected to post-heating.

* * * * *

UNITED STATES PATENT AND TRADEMARK OFFICE
CERTIFICATE OF CORRECTION

| | |
|---|---|
| PATENT NO. | : 7,844,153 B2 |
| APPLICATION NO. | : 11/569788 |
| DATED | : November 30, 2010 |
| INVENTOR(S) | : Toshinori Watanabe and Takuya Ogawa |

It is certified that error appears in the above-identified patent and that said Letters Patent is hereby corrected as shown below:

ON THE TITLE PAGE:

Item (73) Assignee:

Delete:
"DOW CORNING CORPORATION    TOKYO, JAPAN"

Insert:
-- DOW CORNING CORPORATION    MIDLAND MICHIGAN --
-- DOW CORNING TORAY COMPANY, LTD.    TOKYO, JAPAN --

Signed and Sealed this
Seventeenth Day of January, 2012

David J. Kappos
*Director of the United States Patent and Trademark Office*